United States Patent [19]

Cuneo et al.

[11] Patent Number: 5,538,372
[45] Date of Patent: Jul. 23, 1996

[54] AUTOMATED AND INTEGRATED APPARATUS FOR THREE AXIS PROCESSING

[75] Inventors: Giuseppe Cuneo, Calolzio Corte; Carlo Rosa, Lecco, both of Italy

[73] Assignee: Black & Decker Inc., Newark, Del.

[21] Appl. No.: 26,350

[22] Filed: Mar. 4, 1993

[30] Foreign Application Priority Data

Mar. 5, 1992 [IT] Italy .................................. MI92A0491

[51] Int. Cl.⁶ ........................................................ B23C 1/06
[52] U.S. Cl. ................................ 409/131; 408/3; 409/80
[58] Field of Search ........................... 409/80, 202, 131; 29/26 A; 408/3, 10 R; 483/4

[56] References Cited

U.S. PATENT DOCUMENTS

| 3,650,178 | 3/1972 | Appleton ............................... 408/236 X |
| 4,518,308 | 5/1985 | Grzybowski et al. .................. 414/735 |

FOREIGN PATENT DOCUMENTS

| 3336496 | 4/1985 | Germany . |
| 3629367 | 3/1988 | Germany . |
| 2136332 | 9/1984 | United Kingdom .................... 29/26 A |
| 2143205 | 2/1985 | United Kingdom . |

OTHER PUBLICATIONS

B. Muller, "Individuell und preiswert steuern", Feinwerktechnik & Messtechnik vol. 98, No. 7/8 Aug. 1990, Muenchen pp. 148–152.
Abstract of Japanese Patent Publication 58–52–703 in Patent Abstract of Japanese vol. 7, No. 138, published Jun. 16, 1983.
Database WPI, Week 9045, Derwent Publications Ltd., London, GB; 90–340360 (Anonymous) vol. 318, No. 11, 10 Oct. 1990.

*Primary Examiner*—Daniel W. Howell
*Attorney, Agent, or Firm*—Charles E. Yocum; Dennis A. Dearing; Frederick H. Voss

[57] ABSTRACT

A processing machine comprises at least three powered guides (13,15,27) for movement along Cartesian axes for a support (12) to hold a tool (21) on a horizontal table (11). Motors (14,16,19) for movement along the three guides are connected to an integrated control device in the machine comprising a microprocessor sending to the motors movement signals reading data for position and moving from memories connected thereto, at least one of said memories being enclosed in an external module (125) connected in a removable manner to the microprocessor through a connector arranged toward the outside of the machine. To the microprocessor are also connected a keyboard (130) for sending command signals and means (131) for display of operating information.

16 Claims, 4 Drawing Sheets

AUTOMATED AND INTEGRATED APPARATUS FOR THREE AXIS PROCESSING

BACKGROUND OF THE INVENTION

This invention relates to automated devices comprising a work table on which a processing tool, e.g. a milling cutter moves along three Cartesian axes.

In the known art such devices are controlled by an external computer, e.g. a personal computer, in which must be first installed a processing program.

The cost of a work station including the Cartesian axes device and the control computer plus the various accessories necessary for their mutual connection, is rather high, making the system economically advantageous only for voluminous production. In addition, the requirement to program the computer with all the information necessary for the required processing requires the partial use of skilled personnel, which makes still more uneconomical the use thereof for small production runs, inhibiting the employment of such devices by small industry, hobbyists, etc.

The general purpose of the present invention is to obviate the above mentioned shortcomings by providing a device for the automatic processing of surfaces, the device having a reduced cost and being easy and rapid to employ while not requiring connections to an external processing unit.

SUMMARY OF THE INVENTION

In accordance with the present invention, there is provided a processing machine comprising a vertical guide along which runs by means of a first motor a support carriage to support a tool, the vertical guide being supported by a second carriage running by means of a second motor along a first horizontal guide which is supported at one end by a third carriage running by means of a third motor along a second horizontal guide arranged at a right angle to the first horizontal guide, the support moving along the three Cartesian axes over a horizontal work table, the three motors being connected to a control device integrated in the machine and comprising a microprocessor sending to the motors signals for movement by reading position and movement data from memories connected thereto, at least one of said memories being enclosed in a case and connected in a removable manner to a control module through a connector arranged toward the outside of the module, there being also disposed on the module a keyboard for sending command signals and display means for operational information. Said microprocessor may be included in said control module or be connected thereto.

The memory which is removably connected to the control module may be a read-only memory. Alternatively, the memory may be a random access memory (RAM), said case further comprising power batteries for the memory for holding therein data upon disconnection of power through the connector for connection to the module. The case may also comprise a switch for sending to the random access memory a signal for inhibition of writing therein.

Preferably there are two memories which are each enclosed in a case and each connected in a removable manner to the control module. This provides a number of advantages. Some applications can require a working program stored in one memory and stored data (for example from a three-dimensional sensing head for copying an existing design) in the second memory. In another instance, an enhanced version of operating software may be provided in one memory while the second memory is employed for a user program. Of course, with two detachable memories, copying of one to the other is permitted for backup purposes. Finally, it is possible to have a standard software library on one memory and user programs on the other memory which access the library.

The display means may comprise an alphanumeric display. The keyboard may comprise at least three groups of keys, a first group controlling predefined functions, a second group directly controlling movement of the motors, a third group controlling input of movement and position data in the memories connected to the microprocessor.

Preferably the microprocessor sends control signals to the display upon reception of control signals from the first group of keys to signal activation of predefined functions.

Preferably the electric motors are stepping motors. Moreover, the module may have connections for communication with a personal computer.

The guides may be provided with an elongated and boxed structure, there running inside the structure the associated carriage with said support projecting outside through a longitudinal slot in the structure. Within the boxed structure there may be placed a screw longitudinal to the guide and rotated by the corresponding motor to screw into a nut screw in the carriage to control running thereof along the guide.

The guides preferably comprise at at least one of their ends sensors for detecting the reaching of said end by the corresponding carriage, said sensors sending to the microprocessor a stop signal.

Said module may be supported at the end of a jointed orientation arm, and the arm may constitute a passage for electrical connections to the elements in the container To further clarify the explanation of the innovative principles of the present invention and its advantages as compared with the known art there is described below with the aid of the annexed drawings a possible embodiment as nonlimiting examples applying said principles.

DETAILED DESCRIPTION OF THE PREFERRED EMBODIMENTS

Figure 1:
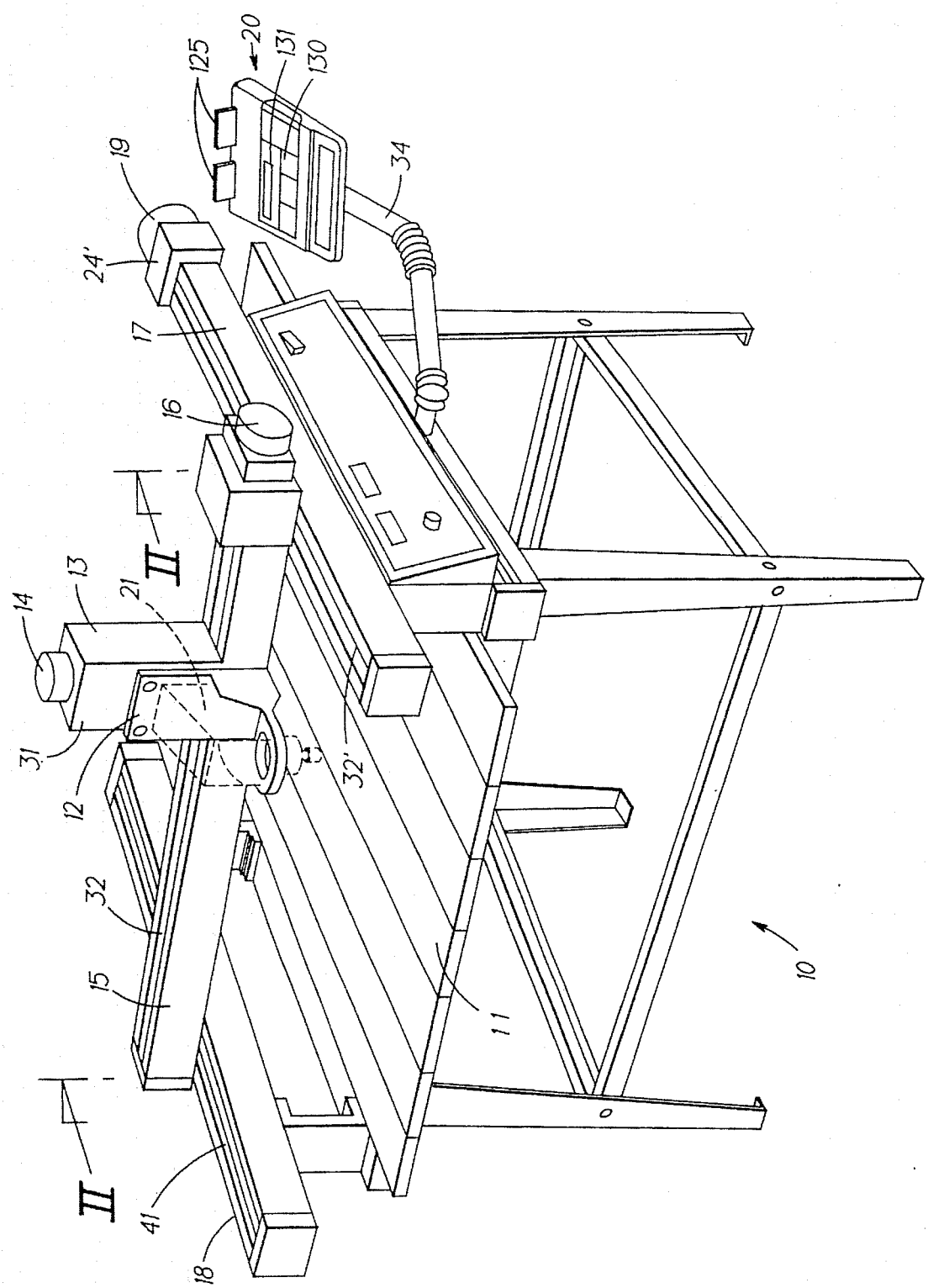
FIG. 1 shows schematically a perspective view of a device in accordance with the present invention.

With reference to the drawings, FIG. 1 shows a device indicated generally by reference number 10, comprising a work table 11 on which is present a support 12 moved vertically along a first guide 13 powered by a first motor 14 or Z axis motor. The vertical guide 13 is in turn movable along a horizontal guide 15 by means of a second motor 16 or X axis motor.

The guide 15 is supported at the ends by two guides 7,18 arranged horizontally at right angles thereto. The guide 15 is thus movable horizontally along said guides 17,18 by means of a third motor 19 or Y axis motor.

The motors 14,16,19 are operated, as will be clarified below, by an electronic circuit with microprocessor incorporated in the device 10 and having a control panel or module 20, for example supported in a container at the end of a jointed arm 34 which can also constitute internally a passage for the electrical connections.

The support 12 can receive an electric tool of the known art and therefore not further described nor shown, such as for example a mill or router, drawn in broken lines and indicated in FIG. 1 by reference number 21. To this end the support can include known complementary couplings with couplers in the tool.

Figure 2:
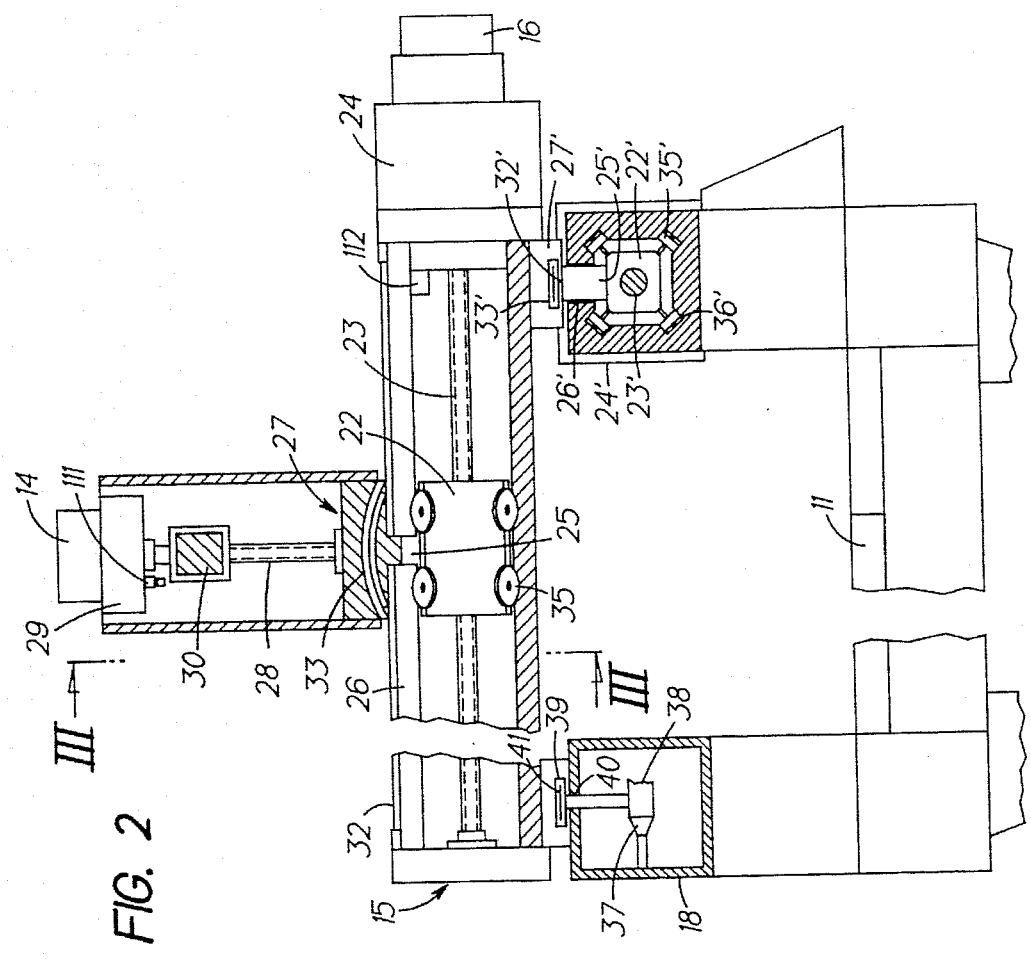
FIG. 2 shows a fragmentary view partially cross sectioned along plane of cut II—II of FIG. 1.

In FIG. 2 is shown schematically a cross section of the device 10 taken along the guide 15. As may be seen in said figure, the guide 15 is made from a boxed section in which runs a carriage 22 moved by a screw 23 operated by the motor 16 through a speed reducer 24. The carriage 22 has a part 25 projecting from the guide through a longitudinal slot 26 to terminate with a supporting end 27 to which is fixed the vertical guide 13. The guide 13, also provided in boxed form comprises a screw 28 moved by the motor 14 through a speed reducer 29. On the screw 28 runs a nut screw carriage 30 to which is fixed through a groove 31 (FIG. 1) the support 12 for the tool. To prevent penetration of dust or processing chips inside the guide 15, the slot 26 is closed by a flexible strip 32 which is raised and moved away from the slot only opposite the end of the support 27 to pass through a passage 33 therein. In this manner the part 25 can project from the slot 26, elsewhere closed by the strip 32.

Figure 3:
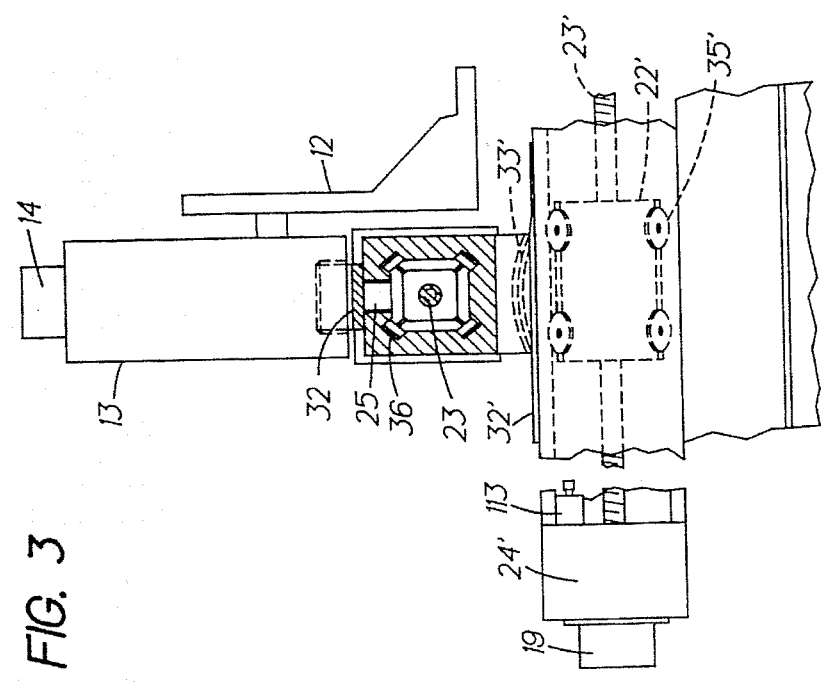
FIG. 3 shows a fragmentary view partially cross sectioned along plane of cut III—III of FIG. 2.

As may be seen in FIG. 3, the carriage 22 has roller bearings 35 for guided running along complementary grooves 36 inside the guide 15.

The guide 17 is substantially identical to the above described guide 15. For this reason the analogous elements will be indicated below with the same numbering used above but with the addition of the suffix "prime".

As may be well seen in FIGS. 2 and 3 the guide 17 is provided with a boxed section in which runs a carriage 22' moved by a screw 23' operated by the motor 19 through a speed reducer 24'. The carriage 22' has roller bearings 35' for guided running along complementary longitudinal grooves 36' inside the guide 17. In addition, the carriage 22' has a part 25' projecting from the guide through a longitudinal slot 26' to terminate with a supporting end 27' to which is fixed one end of the horizontal guide 15.

To prevent penetration of dust or processing chips into the guide 17 the slot 26' is closed by a flexible strip 32' passing through a passage 33' in the supporting end 27'.

As may be well seen in FIG. 2, the guide 18 is provided merely with a boxed section in which is arranged a track 37 on which runs an idling wheel 38 supported on the guide 15 by means of a support 39 projecting from the guide 18 through a longitudinal groove 40, also advantageously closed by a protective strip 41 through the support 39 to allow sliding movement, similarly to what was described for the guides 15 and 17.

It is now clear how, by appropriate control of the motors 14,16,19 a tool positioned on the support 12 can be moved to any point on the table 11 and can be brought near to, or be withdrawn from, the table.

Figure 4:
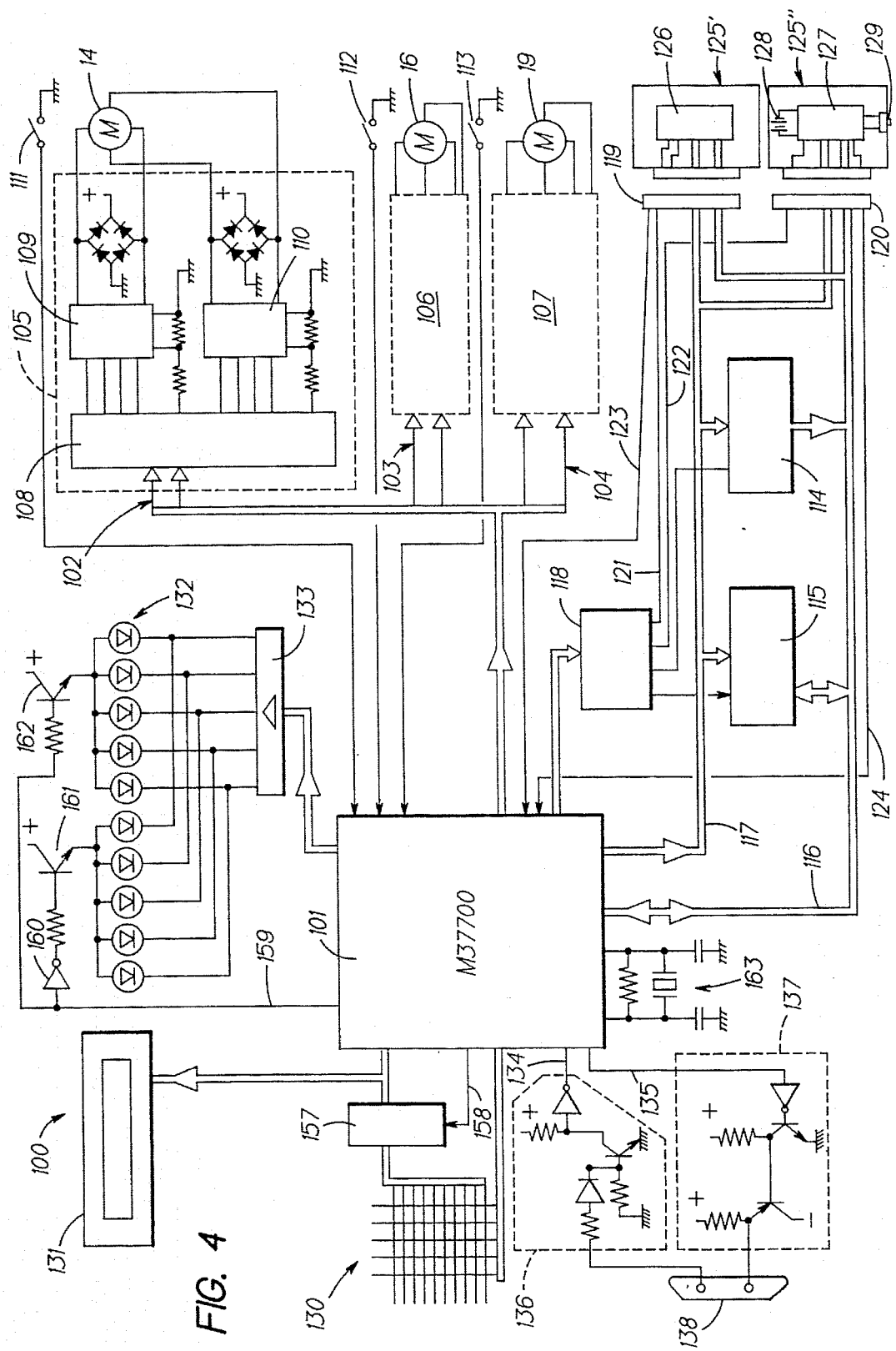
FIG. 4 shows a block diagram of the control system of the device of FIG. 1; and, FIG. 5 shows a front view of a command keyboard for the device of FIG. 1.

FIG. 4 shows a block diagram of an electronic control circuit for the motors provided in accordance with the innovative principles claimed herein.

Said electronic circuit 100 comprises a microprocessor unit 101 advantageously provided by a known single integrated microcontroller such as the M37700 microcontroller which possess a plurality of 2-way ports for control of external circuits.

The microprocessor 101 is connected through lines 102, 103,104 to known interfaces 105,106,107 for control of electric motors. Advantageously the motors 14,16,19 are stepped motors so as to provide precise movements without recourse to costly circuits with position feedback. For this reason the interfaces 105,106,107 are of a known type for control of stepped motors and each receives a pulsed signal to advance once step and a motor rotation direction signal. Since the three interfaces are substantially identical, for the sake of simplicity the drawing shows only the interface 105 in greater detail. As may be seen, said interface comprises a first circuit 108 for generation of the phase pulses for the motor and the amplifier circuits 109,110 for powering the motor. Said circuits are readily imaginable to those skilled in the art. For example, they can be provided by integrated circuits L297 and L6203 respectively. With each motor is also associated a corresponding microswitch 111,112,113 placed (as seen in FIGS. 2 and 3) at one end of the respective guide 13,15,17 so as to provide a stop indication for the carriages. In this manner it is possible to supply to the microprocessor 101 a reference signal of absolute zero for counting the motor movement steps.

The circuit 100 comprises also a read only memory (ROM) 114 containing the program for management of the work station 10 and a random access memory (RAM) 115 for temporary data. The management program being readily imaginable by those skilled in the art, especially in the light of the following description of operation, it will not be described in detail here. The memories 114,115 are connected to the microprocessor 101 through lines of data and addresses 116,117 and are selected by the microprocessor 101 through a selection and decoder circuit 118.

Innovatively for the specific application, the circuit 100 comprises connectors 119,120 on which are present the signals for the data and address lines 116,117 and additional selection signals 121,122 coming from the selector 118.

Additional lines 123,124 are connected between the connectors 119,120 and the microprocessor 101 to signal to the latter coupling on the respective connector of an external memory module or case 125. The memory cases 125 can be substantially of two types. Case 125' contains ROMs 126, while case 125" contains RAMs 127. In the latter instance it can be advantageous to use a low consumption RAM such as a CMOS memory and there can be provided inside the module a buffer battery 128 to power the memory to hold the information inserted therein even when the station 10 is shut down or when the module is disconnected from the connector 120. There can also be provided a switch 129 allowing disenabling of the writing function in the memory 127.

To the microprocessor 101 can also be connected a keyboard 130, advantageously of the matrix type, an alphanumeric display 131, e.g. with liquid crystals with a single line of 24 characters, and a plurality of LED optical indicators 132 piloted by a separator circuit 133.

To save control lines of the microprocessor 101, the keyboard 130 and the display 131 can be connected alternately and cyclically to the same group of control lines of the microprocessor by means of a selector 157 under the control of a selection line 158 controlled by the microprocessor 101. For the same reason the LEDs 132 can be connected in two groups selected alternately from a line 159 through an invertor 160 and transistors 161,162.

The microprocessor 101 also comprises an input line 134 and an output line 135 connected through signal adaptors 136,137 to a connector 138 to provide a communications connection with the outside, e.g. by means of a serial transmission in RS232 standard or the like. It is thus possible optionally to connect to the work station an external computer or peripherals such as a printer.

Finally, the microprocessor 101 receives from a circuit 163 the clock frequency for its operation.

Figure 5:
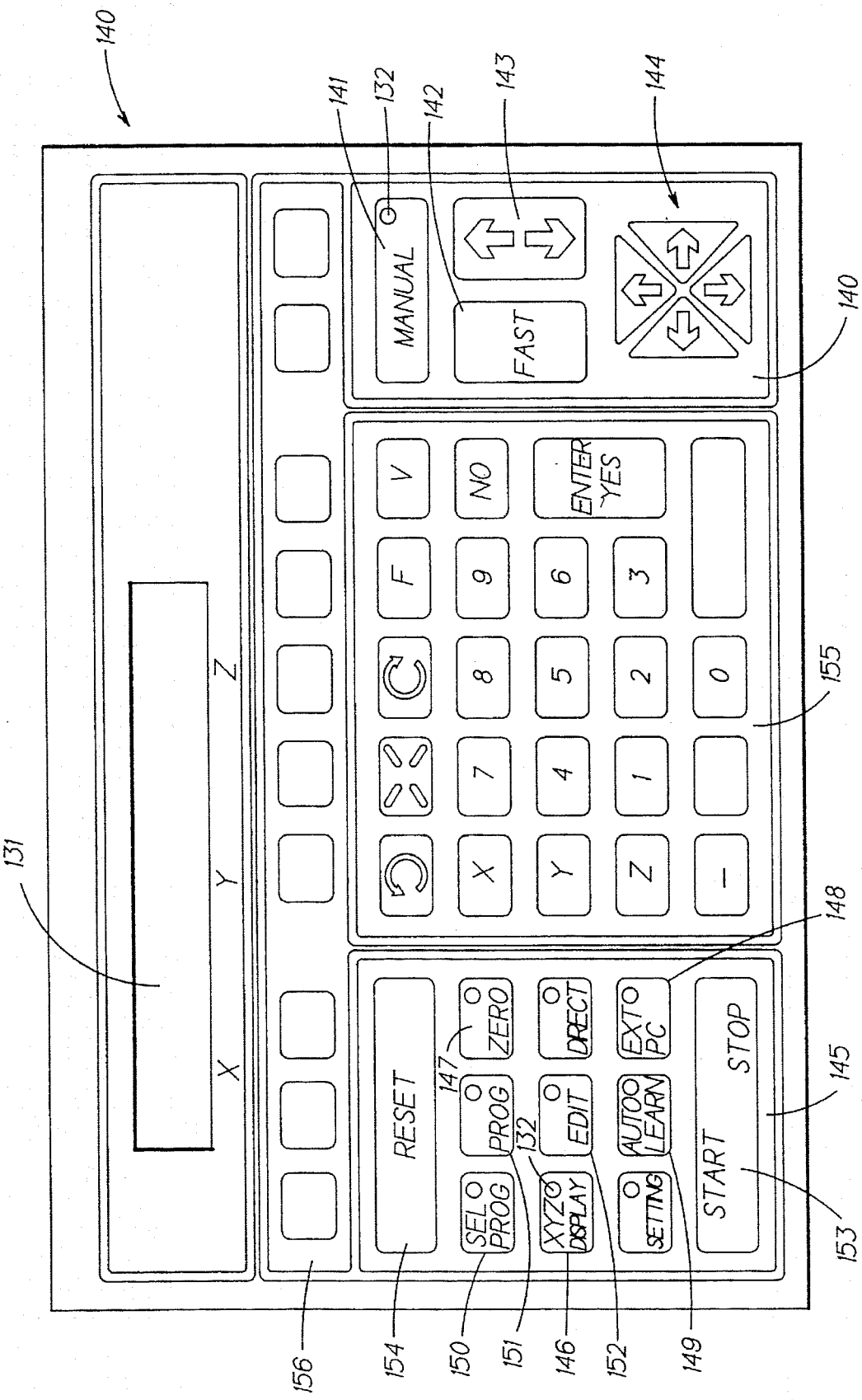

FIG. 5 shows an example of a front plate 140 for the control module 20 with a possible arrangement of the keys, the LEDs and the display. The functions of the various keys of the keyboard are clarified below. Said keyboard can be advantageously provided of the flexible membrane type to ensure good resistance to dust produced during operation.

As may be seen in FIG. 5 the keyboard can be ideally divided in three zones. A first zone 140 comprises keys for manual movement of the tool. Said keys are essentially a key 141 for activating the manual mode. Activation of the manual mode is signaled by illumination of a LED 142 on the key itself; a key 143 for control of raising and lowering of the tool (Z axis); keys 144 for control of the movement of the tool in the four horizontal directions (X and Y axes); and finally a key 142 which, if pressed together with one of the keys 143,144 accelerates the required movement.

A second zone 145 comprises keys for selection of the main functions of the system. For example, a key 146 can be used to request display of the co-ordinates X,Y,Z at which is located the processing head of the tool on the support 12. A key 147 can be used to communicate to the microprocessor 101 that the present position of the tool can be taken as the reference or relative zero position.

In the case of connection to an external computer, there can be provided a key 148 which signals to the microprocessor to connect to the computer. Another key 149 signals to the system to place itself in a state of self-learning in which are recorded for future automatic repetition the manually controlled movements using keys of the zone 140. Keys 150,151,152 can be used to recall, input or correct movement programs.

With each key of the zone 145 mentioned above is associated a corresponding LED 132 to signal activation of the specific function. Other keys can be a key 153 to start or stop performance of a processing program and a key 154 for complete reinitialization of the system.

A third zone 155 comprises all the keys for input of numerical positioning data in relation to the three axes for stepped programming of the movements of the tool.

A fourth zone 156 can comprise a plurality of keys and functions definable for example by the user or specifications of special processing programs.

In use, the typical sequence of operations calls for connection in a connector 119,120 of a memory module 125 containing a prememorized program consisting of a sequence of movements to be completed by the tool. Once the memory module is inserted and power is supplied to the machine, the microprocessor 101 is informed by the line 123 or 124 of the presence of the module. Using the keyboard 140 it is thus possible to give commands for selection and starting of the program contained in the module.

Advantageously the read only module 125' can be supplied to the user programed to perform standard processing such as for example milling of ornamental details on surfaces. In this case, the user only has to choose the desired ornament, set on the keyboard the processing starting point and optionally the scale, and start it. It is clear that such a procedure is fast and readily applicable even by the less skilled user.

In addition to use of predefined functions, for the user it is naturally possible also to program his own sequences of movements using the keyboard 140 to create his own programs to obtain specially processing. In this case, the programs created can be stored in the module 125" which, once programed, can be used in the same manner as the modules 125' with the advantage that it is always possible to modify the memorised movements depending on requirements. Once a module 125" is programed, it is preferable to operate the switch 129 to prevent writing thereon and avoid accidental modifications of the contents.

Even though the device described above is completely independent and capable of operating without other additions it is always possible, as mentioned above, to connect to the connector 138 a personal computer which, appropriately programmed, can send commands to the microprocessor 101, e.g. to provide movements set on the personal computer using a drawing program.

At this point it is clear that the purpose of providing an automatic processing unit which is economical and easy to use has been achieved.

Naturally the above description of an embodiment applying the innovative principles of the present invention is given merely by way of example and therefore it is not to be taken as a limitation of the patent right claimed here.

For example, the mechanical structure could be different from that shown. For example, the guides could move the respective carriages using toothed belts in place of the screw and nut screw pair. In addition, the appearance of the panel and its position on the machine could be different just as the number, arrangement and function of the keys of the control keyboard could be different. The guide 18 could be provided similarly to the guide 17 even with a neutral carriage. Lastly, the tool can of course be of any type, e.g. an electric milling cutter, cutting or drilling tools, etc.

What is claimed is:

1. A processing machine comprising:
   a) a tool;
   b) a first carriage for the tool;
   c) a vertical guide in which said first carriage runs;
   d) a first motor to drive said first carriage along said vertical guide;
   e) a second carriage supporting said vertical guide;
   f) a first horizontal guide in which said second carriage runs;
   g) a second motor to drive said second carriage along said first horizontal guide;
   h) a third carriage supporting said first horizontal guide;
   i) a second horizontal guide, perpendicular to said first horizontal guide, in which said third carriage runs;
   j) a third motor to drive said third carriage along said second horizontal guide;
   k) a worktable over which said tool is moved by said motors, carriages and guides along three Cartesian axes;
   l) a jointed orientation arm connected to said machine; and
   k) a control module integrated in said machine and supported by said jointed orientation arm for controlling said motors, said control module further comprising;

i) a microprocessor to send movement signals to said first, second, and third motors;

ii) memories containing position and movement data, at least one of said memories being enclosed in a case which is connected in a removable manner to said control module through a connector of said module, which connector is arranged towards the outside of said module;

iii) a keyboard for sending command signals to said microprocessor, wherein said keyboard comprises at least three zones of keys, a first zone controlling predefined functions, a second zone directly controlling input of movement of the motors, a third zone controlling input of movement and position data in the memories connected to said microprocessor; and iv) display means for displaying operational information.

2. Machine in accordance with claim 1, wherein the memory contained in the case is a read-only memory.

3. Machine in accordance with claim 1, wherein the memory contained in the case is a random access memory (RAM) and said case further comprises power batteries for the memory for holding therein data upon disconnection of power through the connector for connection to the module.

4. Machine in accordance with claim 3, wherein said case comprises a switch for sending to the random access memory a signal for inhibition of writing therein.

5. Machine in accordance with claim 1, wherein there are two memories which are each enclosed in a case and each connected in a removable manner to the control module.

6. Machine in accordance with claim 1, wherein the display means comprises an alphanumeric display.

7. Machine in accordance with claim 1, wherein the display means comprises luminous signaling lights.

8. Machine in accordance with claim 1, wherein the display means comprises luminous signaling lights and wherein the microprocessor sends control signals to the luminous signalling lights upon reception of control signals of the first zone of keys to signal activation of the predefined functions.

9. Machine in accordance with claim 1, wherein the electric motors are stepping motors.

10. Machine in accordance with claim 1, wherein the microprocessor has connections for communication with a personal computer.

11. Machine in accordance with claim 1, wherein the guides comprise at at least one of their ends sensors for detecting the reaching of said end by the corresponding carriage, said sensors sending to the microprocessor a stop signal.

12. Machine in accordance with claim 1, wherein the arm constitutes a passage for electrical connections to the elements in the container.

13. A machine in accordance with claim 10, wherein said machine can be placed in a state of self-learning in which command signals manually sent on said keyboard are recorded for future automatic repetition.

14. A machine in accordance with claim 1, wherein said memories contain prememorized programs of a sequence of movements to be completed by said tool.

15. A method of operating a machine, said machine comprising a tool;

a worktable over which said tool is moved by three motors, three carriages, and three guides along three Cartesian axes;

a jointed orientation arm connected to said machine; and a control module integrated in said machine and supported by said jointed orientation arm for controlling said motors, said control module further comprising;

i) a microprocessor to send movement signals to said three motors;

ii) memories containing position and movement data, at least one of said memories being enclosed in a case which is connected in a removable manner to said control module through a connector of said module, which connector is arranged towards the outside of said module;

iii) a keyboard for sending command signals to said microprocessor, wherein said keyboard comprises at least three zones of keys, a first zone controlling predefined functions, a second zone directly controlling input of movement of the motors, a third zone controlling input of movement and position data in the memories connected to said microprocessor; and iv) display means for displaying operational information, said method comprising the steps of:

a) supplying said machine with electrical power;

b) inserting a memory module containing prememorized programs into said case thereby informing said microprocessor of the presence of said module, at least one of said programs directing movement of said tool; and c) commanding said keyboard to select and start said at least one of said programs.

16. A method of operating a machine according to claim 15, wherein said at least one of said programs directs said tool to perform milling operations.

* * * * *